United States Patent
Chang (10) Patent No.: US 12,385,529 B1
(45) Date of Patent: Aug. 12, 2025

(54) COMPLEX CLUTCH APPARATUS

(71) Applicant: Eun Sook Chang, Goyangsi (KR)

(72) Inventor: Eun Sook Chang, Goyangsi (KR)

(*) Notice: Subject to any disclaimer, the term of this patent is extended or adjusted under 35 U.S.C. 154(b) by 0 days.

(21) Appl. No.: 18/995,246

(22) PCT Filed: Aug. 1, 2023

(86) PCT No.: PCT/KR2023/011200
§ 371 (c)(1),
(2) Date: Jan. 16, 2025

(87) PCT Pub. No.: WO2024/058420
PCT Pub. Date: Mar. 21, 2024

(30) Foreign Application Priority Data

Sep. 16, 2022 (KR) .................. 10-2022-0116921

(51) Int. Cl.
- *F16D 7/02* (2006.01)
- *F16D 43/21* (2006.01)
- *B60K 15/05* (2006.01)
- *F16D 13/66* (2006.01)

(52) U.S. Cl.
CPC ............. *F16D 7/028* (2013.01); *F16D 7/022* (2013.01); *F16D 43/218* (2013.01); *B60K 2015/0515* (2013.01); *F16D 13/66* (2013.01)

(58) Field of Classification Search
CPC ............ F16D 7/00–7/028; F16D 13/20; F16D 13/24–13/30; F16D 13/66; F16D 43/218; B60K 2015/0515–2015/0538
USPC ............................................ 464/42; 192/66.2
See application file for complete search history.

(56) References Cited

U.S. PATENT DOCUMENTS

| | | | |
|---|---|---|---|
| 3,024,630 A * | 3/1962 | Billups | F16D 7/02 464/42 |
| 2004/0129524 A1 | 7/2004 | Kurita | |
| 2016/0223040 A1 | 8/2016 | Watzek et al. | |
| 2023/0374842 A1* | 11/2023 | Och | E05B 81/06 |
| 2024/0352980 A1* | 10/2024 | Zhang | E05F 15/614 |

FOREIGN PATENT DOCUMENTS

| | | |
|---|---|---|
| CN | 214617591 U | 11/2021 |
| CN | 113864403 A | 12/2021 |
| JP | 2004-138125 A | 5/2004 |
| KR | 10-2022-0103679 A | 7/2022 |
| KR | 10-2023-0055927 A | 4/2023 |

* cited by examiner

*Primary Examiner* — Richard M Lorence
(74) *Attorney, Agent, or Firm* — LEX IP MEISTER, PLLC

(57) ABSTRACT

Proposed is a complex clutch apparatus which includes a rotating block provided with a central shaft extending upward and an upward inclined protrusion part which surrounds a lower portion of the central shaft and is spaced apart by a predetermined distance from the central shaft, a C-shaped plate spring which surrounds an outer circumferential surface of the upward inclined protrusion part and is in elastically close contact with the outer side surface of the upward inclined protrusion part, a clutch gear provided with a downward inclined protrusion part press-fitted between the central shaft and the upward inclined protrusion part, and a holding protrusion inserted between opposite ends of the C-shaped plate spring in a longitudinal direction thereof; and an elastic body which is fixedly coupled to the central shaft and applies a downward elastic force to an upper surface of the clutch gear.

3 Claims, 9 Drawing Sheets

COMPLEX CLUTCH APPARATUS

TECHNICAL FIELD

The present disclosure relates to a clutch apparatus for transmitting power and, more specifically, a complex clutch apparatus in which components for transmitting and blocking power are configured in multiple stages so as to significantly increase clutch force generated within a limited specification and are able to be manufactured from various types of materials so as to increase the degree of design freedom of the product.

BACKGROUND ART

The fuel filling port or charging port of a vehicle typically uses a cover plate driving device to automatically open and close a corresponding cover plate. The cover plate driving device includes a drive motor, a clutch having an output terminal connected to the rotational shaft of the cover plate, and a reducer located between the drive motor and the clutch to be connected thereto.

The conventional cover plate driving device has a disadvantage in that the amount of the energy consumption of the drive motor increases to effectively drive the cover plate since the transmission efficiency of the reducer is relatively low. In addition, the conventional cover plate driving device has a complex internal structure and the large component sizes, making it difficult to miniaturize the cover plate driving device.

Meanwhile, when the cover plate is configured to be rotated by the drive motor, it is common for the rotational shaft of the cover plate to be connected to the drive shaft of the drive motor with a gear-coupled structure. In this case, there are disadvantages that it is impossible to manually open and close the cover plate from outside the vehicle, and when a rotational force output from the drive motor is excessively large, the cover plate may be damaged.

To solve this problem, a clutch apparatus has been proposed blocks that excessive power transmission to automatically open and close the cover plate and to manually open and close the cover plate.

Hereinafter, a conventional clutch apparatus will be described in detail.

Figure 1:
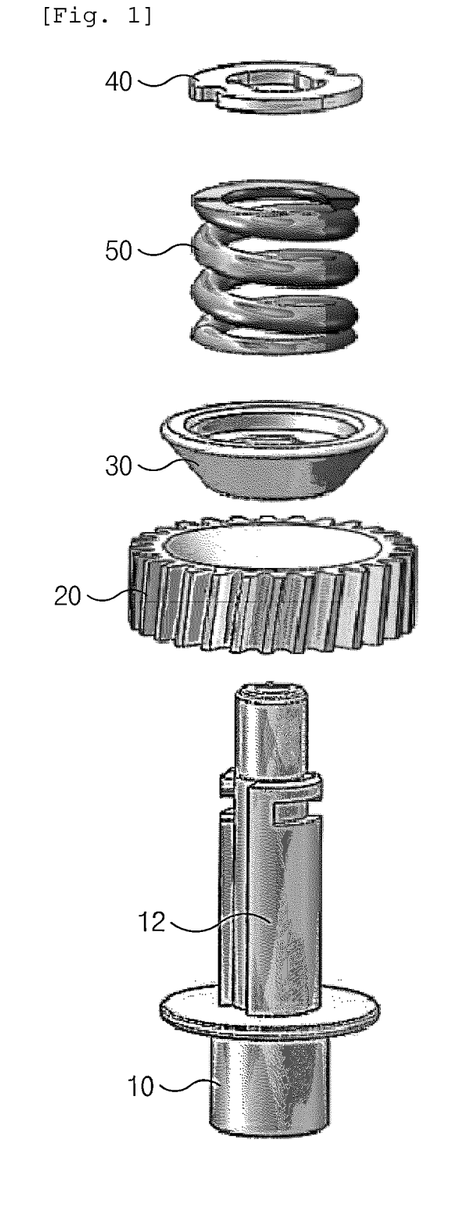
FIG. 1 is an exploded perspective view of a conventional clutch apparatus.

FIG. 1 is an exploded perspective view of the conventional clutch apparatus.

As illustrated in FIG. 1, the conventional clutch apparatus includes a rotating block 10 provided with a central shaft 12 extending upward, a clutch gear 20 into which the central shaft 12 is inserted, a clutch plate 30 seated on the clutch gear 20 and rotating integrally with the central shaft 12, a stopper 40 coupled to an end of the central shaft 12, a spring 50 that is compressed between the clutch plate 30 and the stopper 40 and elastically presses the clutch plate 30 toward the clutch gear 20. When a rotational force is applied to the clutch gear 20, the clutch plate 30 rotates with the clutch gear 20 due to a frictional force between the clutch gear 20 and the clutch plate 30, and the rotating block 10 coupled to the clutch plate 30 also rotates.

In this case, when force that fixes the rotating block 10 is small, the clutch plate 30 rotates with the clutch gear 20 due to frictional force with the clutch gear 20 when the clutch gear 20 rotates. However, when force that fixes the rotating block 10 is greater than the frictional force between the clutch gear 20 and the clutch plate 30, the clutch plate 30 slips on the clutch gear 20 even if the clutch gear 20 rotates, and the clutch plate 30 and the rotating block 10 coupled thereto do not rotate.

In order for the clutch gear 20 and the clutch plate 30 to rotate integrally, the frictional force between the clutch gear 20 and the clutch plate 30 is required to be large, so the clutch gear 20 and the clutch plate 30 are required to be manufactured of materials with a relatively high coefficient of friction. However, since materials with a high coefficient of friction are generally expensive, there is a problem that the manufacturing cost of a clutch apparatus increases. Of course, when the clutch gear 20 and the clutch plate 30 are manufactured to be large in size, a high clutch force can be obtained, but in this case, the problem arises that the overall size of the clutch apparatus increases.

DISCLOSURE

Technical Problem

The present disclosure has been made to solve the above problems, and is intended to propose a complex clutch apparatus, in which clutch force is generated at multiple portions, so that it is possible to obtain high clutch force even when the product is miniaturized, and components that generate clutch force are able to be manufactured from various types of materials, thereby reducing manufacturing costs and increasing the degree of design freedom.

Technical Solution

In order to accomplish the above objectives, a complex clutch apparatus of the present disclosure includes: a rotating block provided with a central shaft extending upward and an upward inclined protrusion part which surrounds a lower portion of the central shaft and is spaced apart by a predetermined distance from the central shaft; a C-shaped plate spring which surrounds an outer circumferential surface of the upward inclined protrusion part and is in elastically close contact with the outer side surface of the upward inclined protrusion part; a clutch gear provided with a downward inclined protrusion part press-fitted between the central shaft and the upward inclined protrusion part when the upward inclined protrusion part is inserted into a lower side of the clutch gear, and a holding protrusion inserted between opposite ends of the C-shaped plate spring in a longitudinal direction thereof; and an elastic body which is fixedly coupled to the central shaft and applies a downward elastic force to an upper surface of the clutch gear.

Each of the upward inclined protrusion part and the downward inclined protrusion part may be formed in a cylindrical shape.

The upward inclined protrusion part may have an inner side surface formed to be inclined in a direction in which an inner diameter of the upward inclined protrusion part decreases gradually toward a lower end of the upward inclined protrusion part, and the downward inclined protrusion part may have an outer side surface formed to be inclined to be in surface contact with the inclined inner side surface of the upward inclined protrusion part.

A side wall of the downward inclined protrusion part may include multiple cutting slits formed thereon, with the cutting slits extending upward from a lower end of the downward inclined protrusion part.

The multiple cutting slits may be arranged in a circular shape about a central axis of the upward inclined protrusion part, and may be spaced apart from each other at equal intervals.

The Downward Inclined Protrusion Part

The rotating block may be provided with a seating flange on which the C-shaped plate spring is seated.

The C-shaped plate spring may be provided with a plurality of C-shaped plate springs.

The elastic body may include an insertion hole formed in a central portion thereof, with the central shaft being inserted into the insertion hole, and may be formed to have a disc shape having height decreasing gradually toward an outer end thereof.

An inner diameter side of the elastic body may be provided with an engaging protrusion that protrudes horizontally, the central shaft may include a large diameter part having a cylindrical shape, and a small diameter part extending upward from an upper end of the large diameter part and having smaller outer diameter than the large diameter part, and the complex clutch apparatus may further include an engaging slit including a vertical slit formed to have a size to allow the engaging protrusion to be inserted thereinto and extending downward from the upper end of the large diameter part, and a horizontal slit extending horizontally from a lower end of the vertical slit.

A holding jaw protruding downward may be provided on an upper end of a portion of the horizontal slit that is connected to the vertical slit.

Advantageous Effects

According to the complex clutch apparatus of the present disclosure, clutch force is generated at multiple portions, so that it is possible to obtain high clutch force even when the product is miniaturized, and components that generate clutch force are able to be manufactured from various types of materials, thereby reducing manufacturing costs and improving the degree of design freedom.

MODE FOR INVENTION

Hereinafter, an embodiment of a complex clutch apparatus of the present disclosure will be described in detail with reference to the accompanying drawings.

Figure 2:
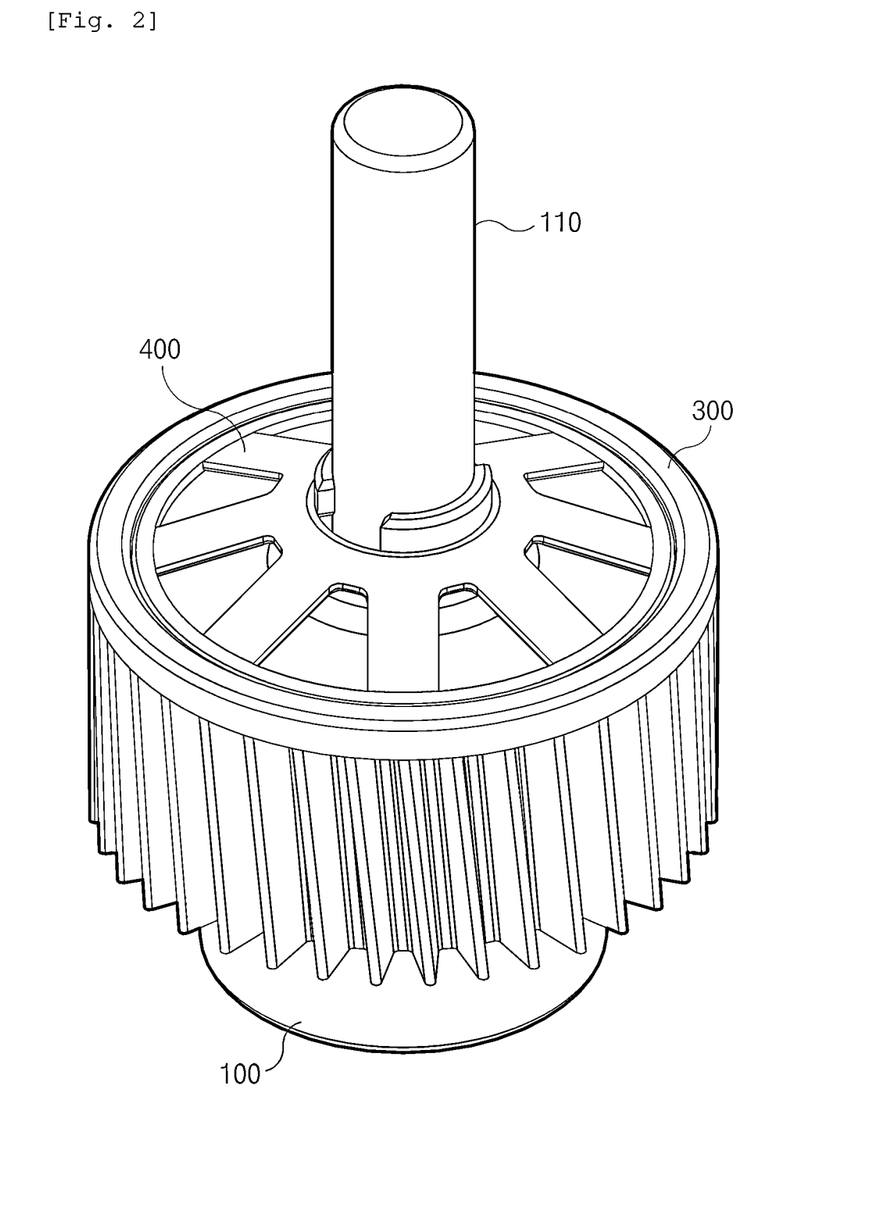
FIG. 2 is a perspective view of a complex clutch apparatus of the present disclosure.
Figure 3:
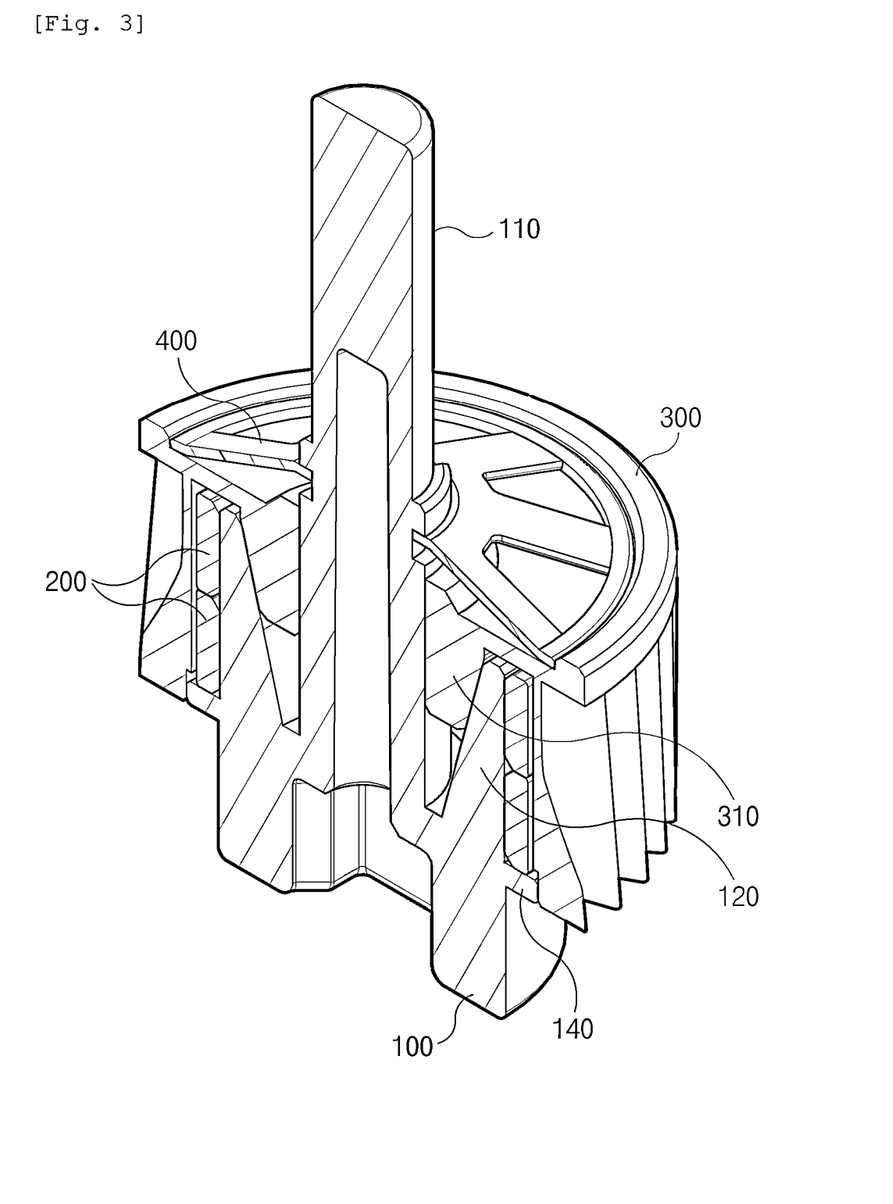
FIG. 3 is a cross-sectional perspective view of the complex clutch apparatus of the present disclosure.
Figure 4:
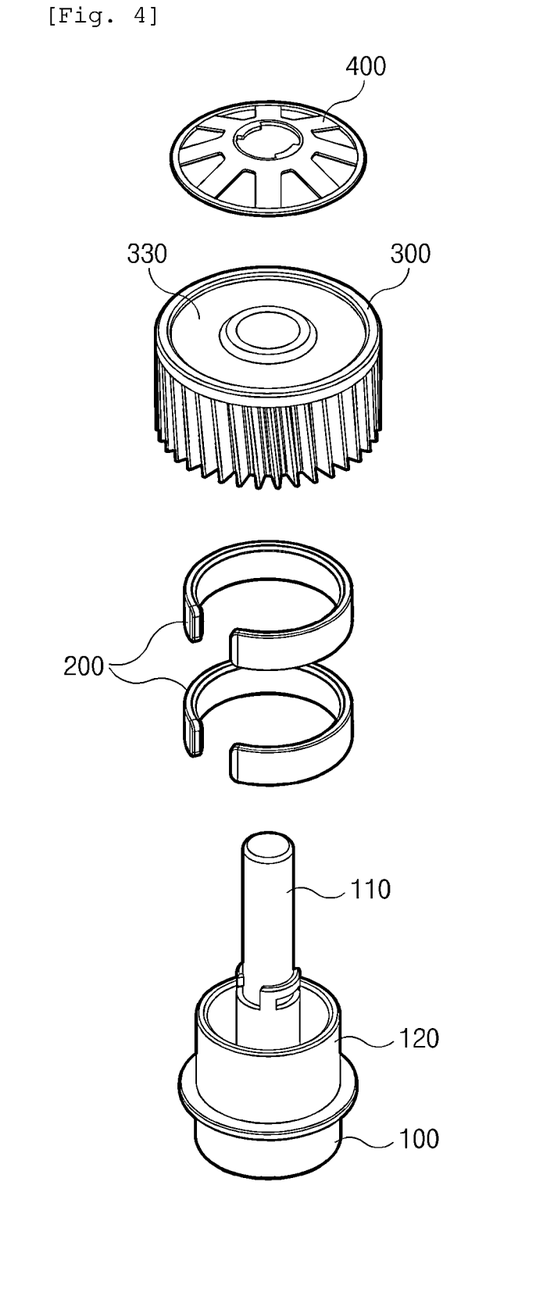
FIG. 4 is an exploded perspective view of the complex clutch apparatus of the present disclosure.
Figure 5:
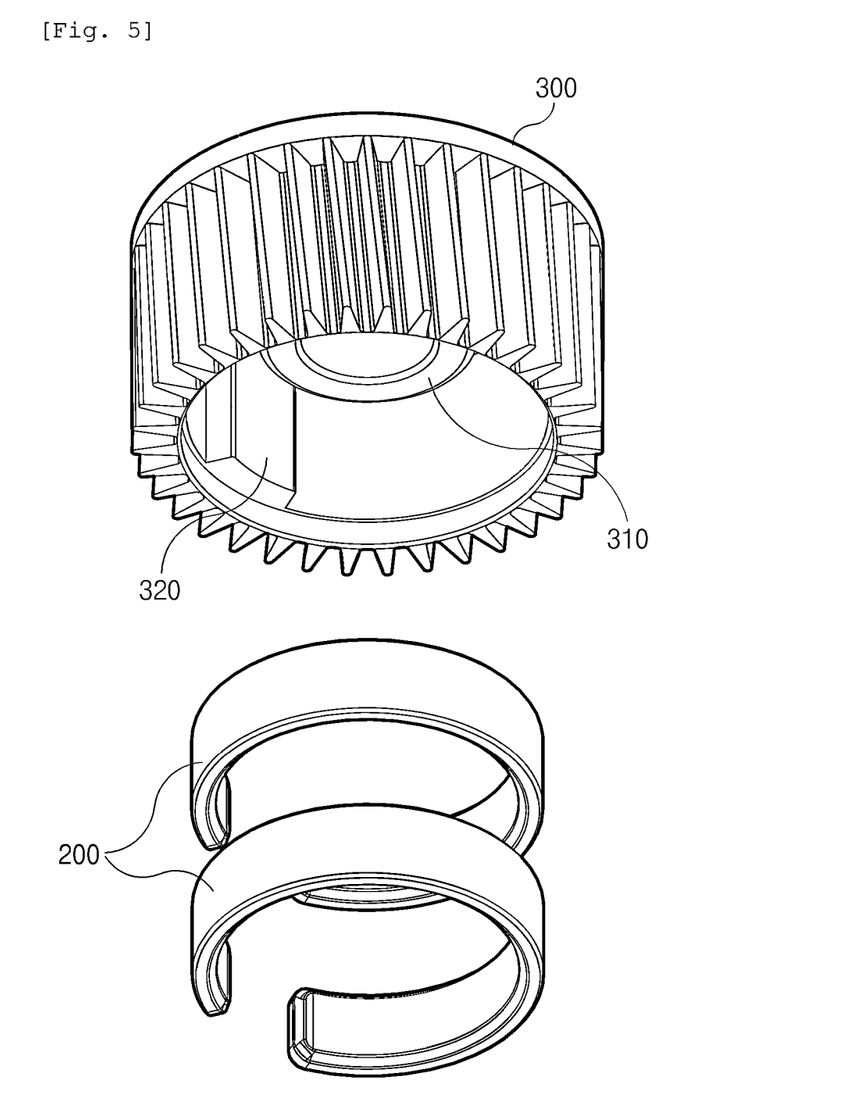
FIG. 5 is an exploded perspective view of a clutch gear and a C-shaped plate spring included in the complex clutch apparatus of the present disclosure.
Figure 6:
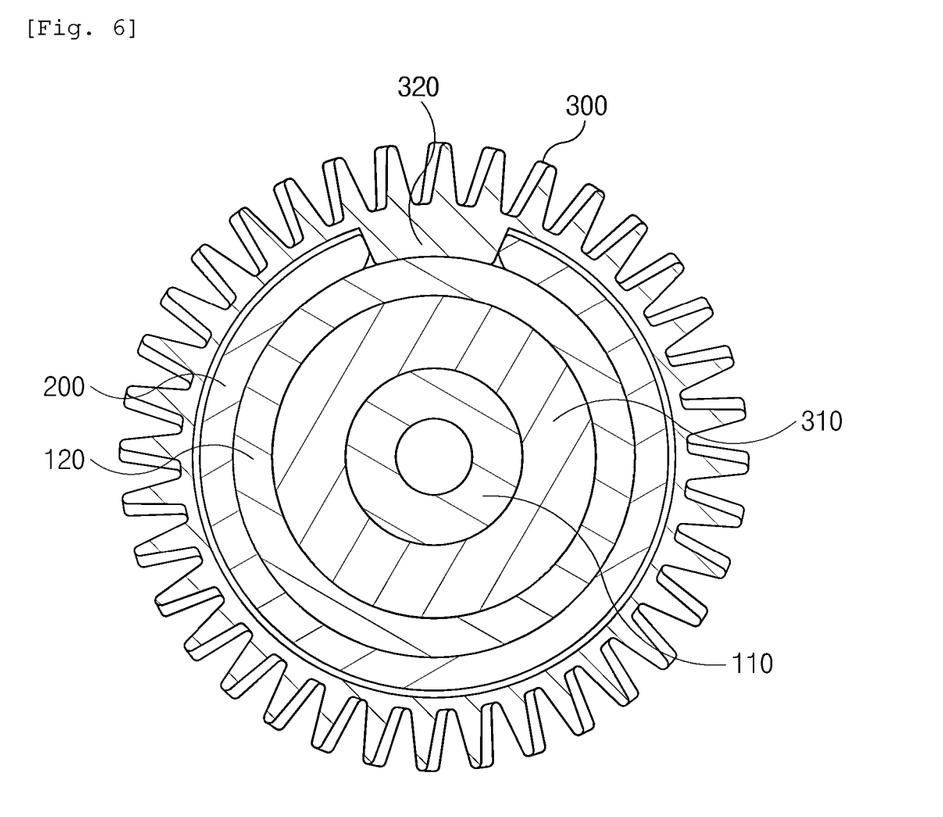
FIG. 6 is a horizontal cross-sectional view of the complex clutch apparatus of the present disclosure.

FIG. 2 is a perspective view of a complex clutch apparatus of the present disclosure, FIG. 3 is a cross-sectional perspective view of the complex clutch apparatus of the present disclosure, FIG. 4 is an exploded perspective view of the complex clutch apparatus of the present disclosure, FIG. 5 is an exploded perspective view of a clutch gear and a C-shaped plate spring included in the complex clutch apparatus of the present disclosure, and FIG. 6 is a horizontal cross-sectional view of the complex clutch apparatus of the present disclosure.

The complex clutch apparatus of the present disclosure is a type of power transmission device for blocking power transmission and releasing the blocking of power transmission to a cover plate applied to a fuel filling port or charging port of a vehicle, and includes a rotating block 100 provided with a central shaft 110 extending upward and an upward inclined protrusion part 120 which surrounds a lower portion of the central shaft 110 to be spaced apart by a predetermined distance from the central shaft 110, a clutch gear 300 provided with a downward inclined protrusion part 310 which is press-fitted between the central shaft 110 and the upward inclined protrusion part 120 when the upward inclined protrusion part 120 is inserted into a lower side of the clutch gear, and an elastic body 400 which is fixedly coupled to the central shaft 110 and applies a downward elastic force to an upper surface of the clutch gear 300.

Since the downward inclined protrusion part 310 is pressed downward by the elastic body 400 and is in close contact with the upward inclined protrusion part 120, a large frictional force is generated between the downward inclined protrusion part 310 and the upward inclined protrusion part 120. Accordingly, when a rotational force is applied to the clutch gear 300 from the outside, the rotating block 100 rotates with the clutch gear 300 due to the downward inclined the frictional force between protrusion part 310 and the upward inclined protrusion part 120.

In this case, the complex clutch apparatus of the present disclosure is further provided with a C-shaped plate spring 200 which surrounds the outer circumferential surface of the upward inclined protrusion part 120 and is in elastically close contact with the outer side surface of the upward inclined protrusion part 120 so that the rotating block 100 is rotated with the clutch gear 300 even if a frictional force between the downward inclined protrusion part 310 and the upward inclined protrusion part 120 decreases, and has a structural feature in that a holding protrusion 320 inserted between the opposite ends of the C-shaped plate spring 200 in the longitudinal direction thereof is provided on the inner side surface of the clutch gear 300.

Since the holding protrusion 320 of the clutch gear 300 is inserted between the opposite ends of the C-shaped plate spring 200 in the longitudinal direction thereof, the C-shaped plate spring 200 always rotates integrally with the clutch gear 300, and since the C-shaped plate spring 200 is in close contact with the outer side surface of the upward inclined protrusion part 120 by an elastic force thereof, a large frictional force is generated between the C-shaped plate spring 200 and the upward inclined protrusion part 120. Accordingly, when the C-shaped plate spring 200 rotates with the clutch gear 300, the upward inclined protrusion part 120 and the rotating block 100 provided with the upward inclined protrusion part 120 also rotate with the clutch gear 300.

Of course, in a case in which force that stops the rotation of the rotating block 100 is greater than the frictional force between the C-shaped plate spring 200 and the upward inclined protrusion part 120, when the clutch gear 300 rotates, slippage occurs between the C-shaped plate spring 200 and the upward inclined protrusion part 120, so that the rotating block 100 does not rotate with the clutch gear 300.

Accordingly, in the complex clutch apparatus of the present disclosure, the rotational force of the clutch gear 300 is transmitted to the rotating block 100 not only by a frictional force between the upward inclined protrusion part 120 and the downward inclined protrusion part 310, but also by a frictional force between the C-shaped plate spring 200 and the upward inclined protrusion part 120, and thus even if the clutch gear 300 and the rotating block 100 are manufactured of materials with a relatively low frictional force, such as synthetic resin, there is an advantage in that a sufficiently high clutch force can be obtained, that is, the degree of freedom in a material of each part is increased.

In addition, as mentioned above, when clutch force occurs at multiple portions, a sufficiently high clutch force can be obtained even if the clutch gear 300 and the rotating block 100 are manufactured small, so there is also an advantage in that the complex clutch apparatus of the present disclosure can be miniaturized.

Meanwhile, the upward inclined protrusion part 120 and the downward inclined protrusion part 310, which are in close contact with each other by the elastic body 400, are required to be in surface contact with each other to increase frictional force therebetween. When a contact surface therebetween is formed to be horizontal, a problem arises in that the diameters of the rotating block 100 and the clutch gear 300 are required to be greatly increased in order to increase a contact area.

The complex clutch apparatus of the present disclosure has another structural feature in that the contact surface between the upward inclined protrusion part 120 and the downward inclined protrusion part 310 is formed to be obliquely inclined so as to solve the above-mentioned problem. For example, the upward inclined protrusion part 120 may be formed in a cylindrical shape, but an inner side surface of the upward inclined protrusion part 120 may be formed to be inclined in a direction in which an inner diameter of the upward inclined protrusion part 120 decreases gradually toward a lower end of the upward inclined protrusion part 120, and the downward inclined protrusion part 310 may have an outer side surface formed to be inclined to be in surface contact with the inclined inner side surface of the upward inclined protrusion part 120.

In this way, when each of the upward inclined protrusion part 120 and the downward inclined protrusion part 310 is formed to have a vertical cross-section in the shape of a wedge, the upward inclined protrusion part 120 and the downward inclined protrusion part 310 are brought into close contact with each other to be in surface contact with each other by the elastic body 400, and a contact area therebetween can be significantly increased within a limited space, so there is an advantage in that a high clutch force can be obtained while miniaturizing the product. In this case, the angle of the contact surface between the upward inclined protrusion part 120 and the downward inclined protrusion part 310 may be changed in various ways depending on various conditions such as the specification and material of each part.

In addition, if each of the upward inclined protrusion part 120 and the downward inclined protrusion part 310 is formed in a wedge shape, the upward inclined protrusion part 120 may be deformed to open outward when the clutch gear 300 rotates while the downward inclined protrusion part 310 is pressed downward. However, in the complex clutch apparatus of the present disclosure, the C-shaped plate spring 200 is pressed against the outer side surface of the upward inclined protrusion part 120, so there is also an advantage in that deformation of the upward inclined protrusion part 120 is prevented.

Meanwhile, to prevent the C-shaped plate spring 200 from coming out of the clutch gear 300 while the rotating block 100 and the clutch gear 300 are rotating, the rotating block 100 may be provided with a seating flange 140 on which the C-shaped plate spring 200 is seated. In this case, it is preferable that the seating flange 140 is formed in a ring shape that surrounds the entirety of the outer circumferential surface of the rotating block 100 so that the entirety of the lower end of the C-shaped plate spring 200 can be seated.

In addition, a contact force between the upward inclined protrusion part 120 and the C-shaped plate spring 200 is determined by the elastic force of the C-shaped plate spring 200. When the C-shaped plate spring 200 is manufactured as one piece, there is a problem in that the contact force between the upward inclined protrusion part 120 and the C-shaped plate spring 200 is not adjustable. In the complex clutch apparatus of the present disclosure, the C-shaped plate spring 200 may include a plurality of C-shaped plate springs so that the contact force between the upward inclined protrusion part 120 and the C-shaped plate spring 200 is adjustable.

Accordingly, when the C-shaped plate spring 200 is provided with a plurality of C-shaped plate springs, there is an advantage that a manufacturer is able to implement the intensity of clutch force desired by a user by appropriately increasing or decreasing the number of C-shaped plate springs 200. In this embodiment, only the case in which two C-shaped plate springs 200 are provided is illustrated, but the number of the C-shaped plate springs 200 may be applied to three or more.

In addition, the elastic body 400, which presses the clutch gear 300 downward, is preferably formed to evenly press the entire upper surface of the clutch gear 300. That is, the elastic body 400 may include an insertion hole 410 formed in a central portion thereof, with the central shaft 110 being inserted into the insertion hole, and may be formed to have a disc shape having height decreasing gradually toward an outer end thereof. In this case, the clutch gear 300 may have a seating groove 330 formed on an upper surface thereof to fit into the outer end of the elastic body 400 so that the outer end of the elastic body 400 may be stably seated.

In this way, when the elastic body 400 is formed in a disk shape, the outer end of the elastic body 400 evenly presses the entire upper surface of the clutch gear 300 downward. Accordingly, the upward inclined protrusion part 120 and the downward inclined protrusion part 310 are in close contact with each other evenly in all parts in each direction, thereby maximizing clutch force.

Figure 7:
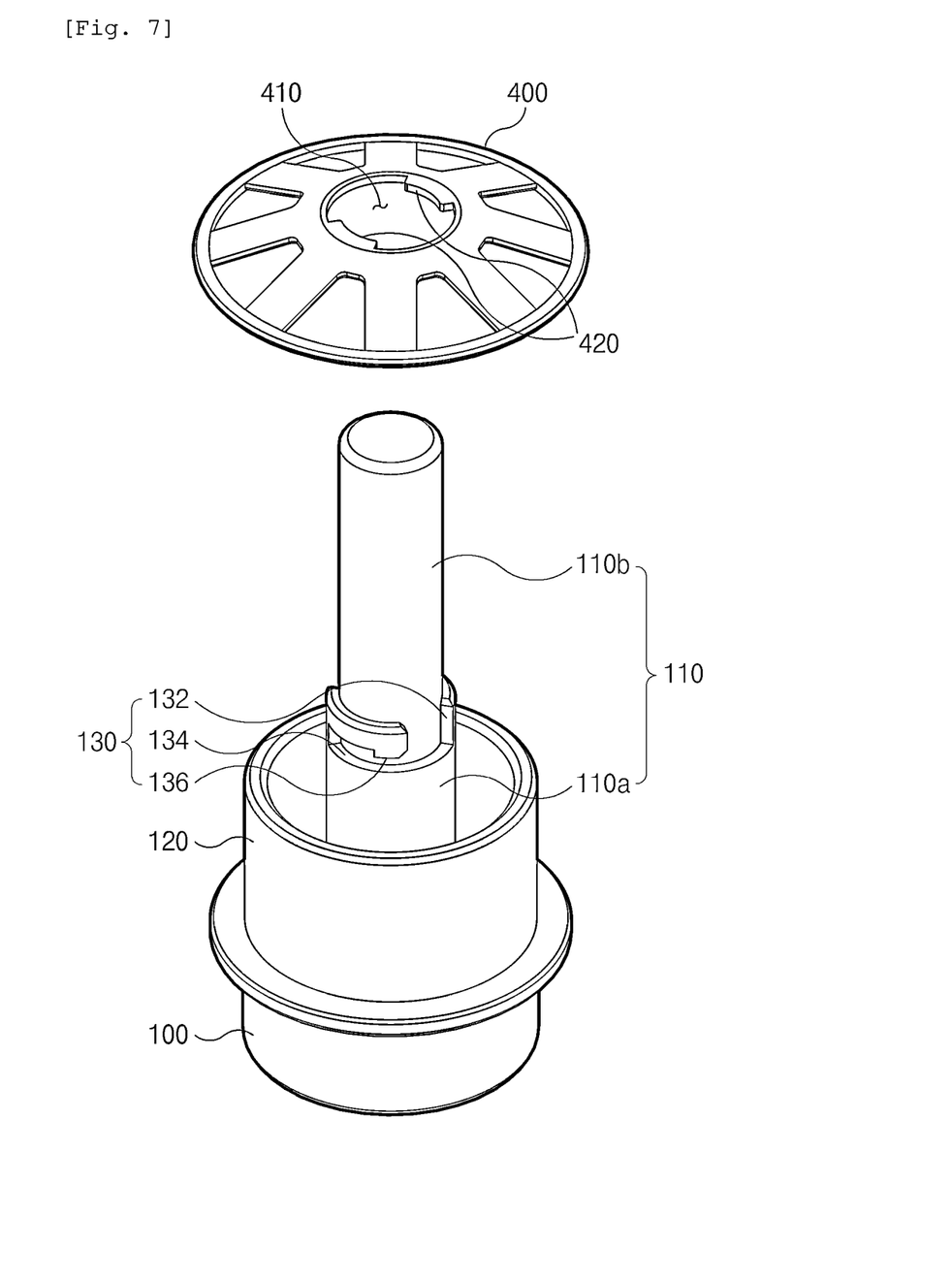
FIG. 7 is an exploded perspective view illustrating the coupling structure of an elastic body and a rotating block.

FIG. 7 is an exploded perspective view illustrating the coupling structure of the elastic body 400 and the rotating block 100.

The complex clutch apparatus of the present disclosure may be configured such that power transmission between the clutch gear 300 and the rotating block 100 is implemented not only by a frictional force between the downward inclined protrusion part 310 and the upward inclined protrusion part 120, a frictional force between the C-shaped plate spring 200 and the upward inclined protrusion part 120, but also by a frictional force between the elastic body 400 and the clutch gear 300.

That is, the elastic body 400, which presses the clutch gear 300 downward, is fixedly coupled to the central shaft 110 of the rotating block 100 and may be installed in to be simply in close contact with the clutch gear 300. In this way, when the outer end of the elastic body 400 is configured to be in close contact with the upper surface of the clutch gear 300, the rotational force of the clutch gear 300 may be transmitted to the central shaft 110 through the elastic body 400, so that the clutch force of the complex clutch apparatus of the present disclosure is further improved.

In addition, when the elastic force of the elastic body 400 is changed, the frictional force between the elastic body 400 and the clutch gear 300 is changed, thereby increasing or decreasing clutch force. Therefore, a user can easily control the clutch force of the complex clutch apparatus of the present disclosure by replacing the elastic body 400 with a product having a different elastic force.

Accordingly, in the complex clutch apparatus of the present disclosure, it is preferable that the elastic body 400 is coupled detachably to the central shaft 110, and that the elastic body 400 coupled to the central shaft 110 is configured to always rotate integrally with the central shaft 110.

For example, the inner diameter side of the elastic body 400 may be provided with an engaging protrusion 420 that protrudes horizontally, and the central shaft 110 may be divided into a large diameter part 110a and a small diameter part 110b extending upward from the upper end of the large diameter part 110a, wherein an engaging slit 130 into which the engaging protrusion 420 can be inserted may be formed in the large diameter part 110a. In this case, the engaging slit 130 may be composed of a vertical slit 132 extending downward from the upper end of the large diameter part 110a, and a horizontal slit 134 extending horizontally from the lower end of the vertical slit 132.

In this way, when the engaging slit 130 is formed in the large diameter part 110a of the central shaft 110, a user may fixedly couple the elastic body 400 to the central shaft 110 by inserting the engaging protrusion 420 of the elastic body 400 into the engaging slit 130. Meanwhile, to prevent slippage between the elastic body 400 and the central shaft 110 when the elastic body 400 rotates with the clutch gear 300, a holding jaw 136 protruding downward is formed on the upper end of a portion of the horizontal slit 134 that is connected to the vertical slit 132. When the holding jaw 136 is formed in n this way, the engaging protrusion 420 interferes with the holding jaw 136 when the elastic body 400 rotates, so that the elastic body 400 and the central shaft 110 always rotate integrally.

Figure 8:
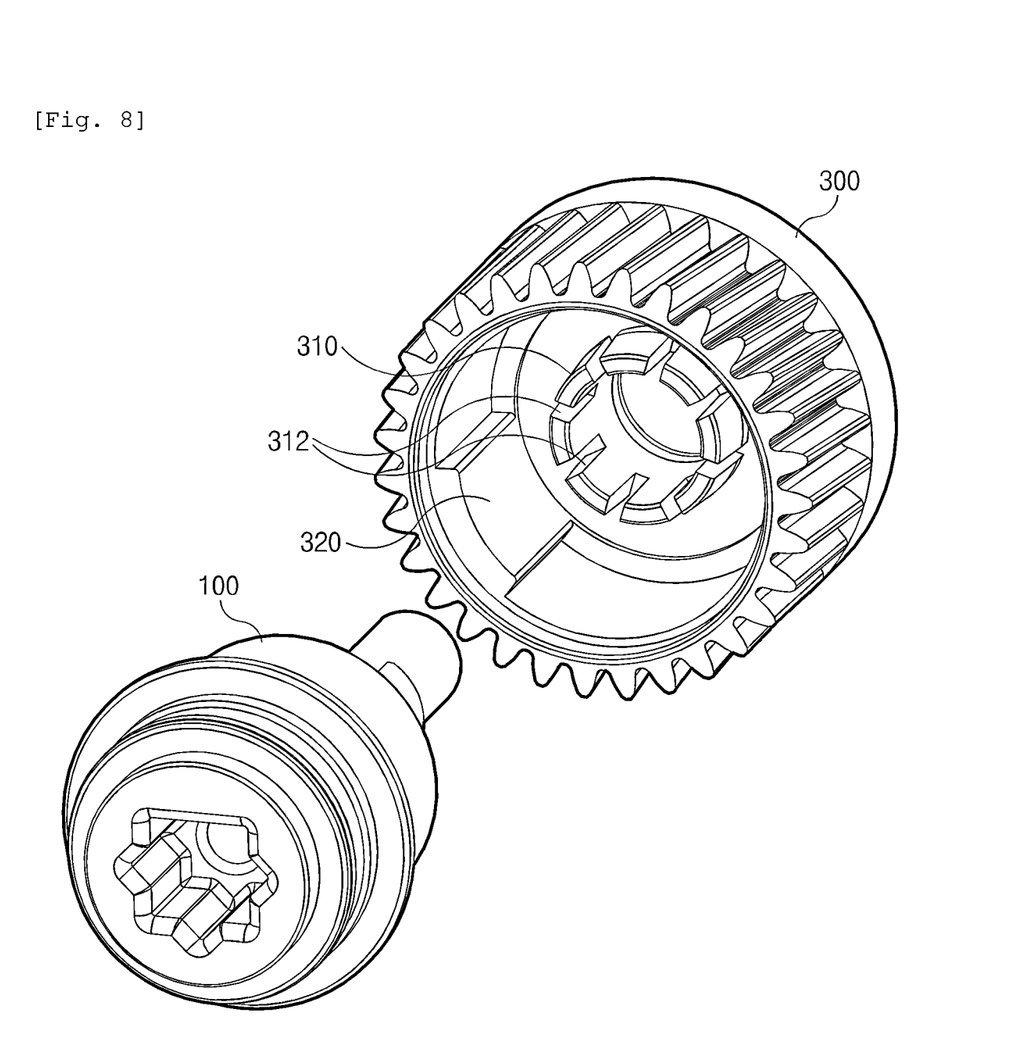
FIG. 8 is a bottom exploded perspective view of a second embodiment of the complex clutch apparatus of the present disclosure.
Figure 9:
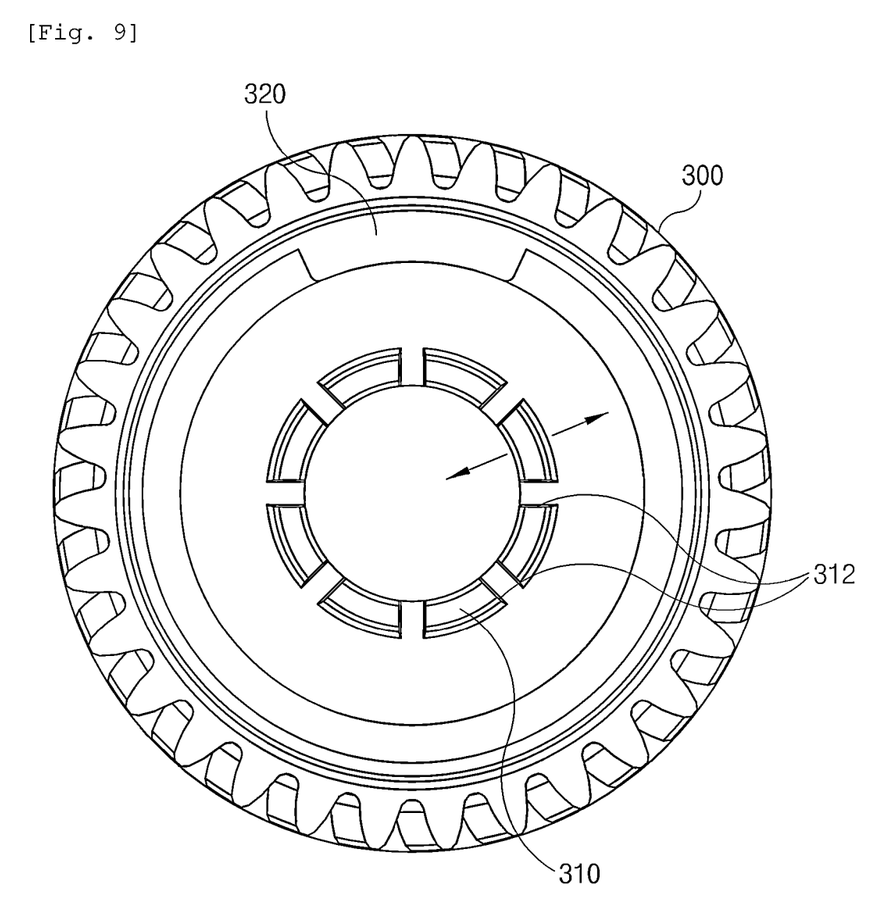
FIG. 9 is a horizontal cross-sectional view of a clutch gear included in the second embodiment of the complex clutch apparatus of the present disclosure.

FIG. 8 is a bottom exploded perspective view of a second embodiment of the complex clutch apparatus of the present disclosure, and FIG. 9 is a horizontal cross-sectional view of the clutch gear included in the second embodiment of the complex clutch apparatus of the present disclosure.

It is preferable that the upward inclined protrusion part 120 and the downward inclined protrusion part 310 included in the complex clutch apparatus of the present disclosure are both formed in cylindrical shapes so as to maximize a contact area therebetween. In this case, when the downward inclined protrusion part 310 is formed in a cylindrical shape, there is no elasticity in a radial direction thereof. Therefore, when the outer side surface of the central shaft 110 and the inner side surface of the upward inclined protrusion part 120 do not form a perfect circle, the outer side surface of the downward inclined protrusion part 310 and the inner side surface of the upward inclined protrusion part 120 may not be in perfectly close contact with each other.

In the complex clutch apparatus of the present disclosure, in order to solve this problem, that is, so that the inclined can downward protrusion part 310 have elasticity in a diametric direction (horizontal direction in this embodiment), the side wall of the downward inclined protrusion part 310 may include multiple cutting slits 312 formed thereon, with the cutting slits 312 extending upward from the lower end of the downward inclined protrusion part 310.

Accordingly, when the multiple cutting slits 312 are formed in the downward inclined protrusion part 310, a portion between two neighboring cutting slits 312 of the downward inclined protrusion part 310 has elasticity in the diametric direction of the downward inclined protrusion part 310 (see the arrow direction of FIG. 9), and the outer side surface of the downward inclined protrusion part 310 and the inner side surface of the upward inclined protrusion part 120 are in perfectly close contact with each other, and thus the effect of improving clutch force can be obtained.

In this case, in order to form elasticity evenly over all parts of the downward inclined protrusion part 310, it is preferable that the cutting slits 312 are arranged in a circular shape about the central axis of the upward inclined protrusion part 120, and are spaced apart from each other at equal intervals. Meanwhile, in this embodiment, only the case in which eight cutting slits 312 are formed in the downward inclined protrusion part 310 is illustrated, but the number and specification of the cutting slits 312 may be variously changed depending on various conditions.

While the present disclosure has been described in detail by using preferred embodiments, the scope of the present disclosure is not limited to specific embodiments, and should be interpreted in accordance with the scope of the appended claims. In addition, those skilled in the art will understand that many modifications and variations are possible without departing from the scope of the present disclosure.

The invention claimed is:

1. A complex clutch apparatus comprising:
    a rotating block provided with a central shaft extending upward and an upward inclined protrusion part which surrounds a lower portion of the central shaft and is spaced apart by a predetermined distance from the central shaft;
    a C-shaped plate spring which surrounds an outer circumferential surface of the upward inclined protrusion part and is in elastically close contact with the outer side surface of the upward inclined protrusion part;
    a clutch gear provided with a downward inclined protrusion part press-fitted between the central shaft and the upward inclined protrusion part when the upward inclined protrusion part is inserted into a lower side of the clutch gear, and a holding protrusion inserted between opposite ends of the C-shaped plate spring in a longitudinal direction thereof; and
    an elastic body which is fixedly coupled to the central shaft and applies a downward elastic force to an upper surface of the clutch gear,
    wherein the upward inclined protrusion part is formed in a cylindrical shape and has an inner side surface formed to be inclined in a direction in which an inner diameter of the upward inclined protrusion part decreases gradually toward a lower end of the upward inclined protrusion part, and the downward inclined protrusion part is formed in a cylindrical shape and has an outer side surface formed to be inclined to be in surface contact with the inclined inner side surface of the upward inclined protrusion part,
    wherein a side wall of the downward inclined protrusion part includes multiple cutting slits formed thereon, with the cutting slits extending upward from a lower end of the downward inclined protrusion part, wherein the multiple cutting slits are arranged in a circular shape about a central axis of the upward inclined protrusion part and are spaced apart from each other at equal intervals, wherein the elastic body includes an insertion hole formed in a central portion thereof, with the central shaft being inserted into the insertion hole, and is formed to have a disc shape having height decreasing gradually toward an outer end thereof, wherein an inner diameter side of the elastic body is provided with an engaging protrusion that protrudes horizontally, wherein the central shaft includes a large diameter part having a cylindrical shape, and a small diameter part extending upward from an upper end of the large diameter part and having smaller outer diameter than the large diameter part, wherein the complex clutch apparatus further includes an engaging slit including a vertical slit formed to have a size to allow the engaging protrusion to be inserted thereinto and extending downward from the upper end of the large diameter part, and a horizontal slit extending horizontally from a lower end of the vertical slit, wherein a holding jaw protruding downward is formed on an upper end of a portion of the horizontal slit that is connected to the vertical slit.

2. The complex clutch apparatus of claim 1, wherein the rotating block is provided with a seating flange on which the C-shaped plate spring is seated.

3. The complex clutch apparatus of claim 1, wherein the C-shaped plate spring is provided with a plurality of C-shaped plate springs.

\* \* \* \* \*